US012240526B2

(12) United States Patent
Kang et al.

(10) Patent No.: US 12,240,526 B2
(45) Date of Patent: Mar. 4, 2025

(54) SIDE SILL ASSEMBLY FOR VEHICLE

(71) Applicants: Hyundai Motor Company, Seoul (KR); Kia Corporation, Seoul (KR)

(72) Inventors: Chang Hak Kang, Hwaseong-si (KR); Chan Woong Jeon, Incheon (KR); Sang Kyoung Han, Gunpo-si (KR); Hae Hoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 18/061,762

(22) Filed: Dec. 5, 2022

(65) Prior Publication Data

US 2024/0059355 A1   Feb. 22, 2024

(30) Foreign Application Priority Data

Aug. 22, 2022   (KR) .................... 10-2022-0105005

(51) Int. Cl.
*B62D 25/02* (2006.01)
*B62D 21/15* (2006.01)
*B62D 25/20* (2006.01)
*B62D 27/02* (2006.01)

(52) U.S. Cl.
CPC ......... *B62D 25/025* (2013.01); *B62D 21/157* (2013.01); *B62D 25/2036* (2013.01); *B62D 27/02* (2013.01); *B60Y 2306/01* (2013.01)

(58) Field of Classification Search
CPC .............. B62D 25/025; B62D 25/2036; B62D 21/157; B62D 27/023

USPC ................... 296/209, 155, 187.12, 29, 30
See application file for complete search history.

(56) References Cited

U.S. PATENT DOCUMENTS

| | | | |
|---|---|---|---|
| 9,045,024 B2 * | 6/2015 | Kwon ................... | B60J 5/06 |
| 10,899,392 B2 * | 1/2021 | Min ....................... | B62D 27/02 |
| 11,654,974 B2 * | 5/2023 | Choi ..................... | B62D 25/2036 |
| | | | 296/193.05 |
| 11,958,533 B2 * | 4/2024 | Kuipers ............... | B62D 21/157 |
| 2022/0194478 A1 | 6/2022 | Song | |

FOREIGN PATENT DOCUMENTS

KR          20220086890 A       6/2022

* cited by examiner

*Primary Examiner* — Dennis H Pedder
(74) *Attorney, Agent, or Firm* — Slater Matsil, LLP

(57) ABSTRACT

An embodiment is a side sill assembly for a vehicle including a side sill inner part coupled to a floor of a vehicle and extending in a longitudinal direction of the vehicle, the side sill inner part having an accommodation space formed by recessing a partial section toward an inside of the vehicle and configured such that a link mechanism connected to a door of the vehicle is rotatably accommodated in the accommodation space, a side sill center part having a cross-section extending from the side sill inner part to an outside of the vehicle, the side sill center part extending in the longitudinal direction of the vehicle along the side sill inner part, and a side sill cover configured to define a closed cross-section by connecting the side sill center part and an upper portion of the side sill inner part in a section except for the accommodation space.

19 Claims, 5 Drawing Sheets

SIDE SILL ASSEMBLY FOR VEHICLE

CROSS-REFERENCE TO RELATED APPLICATIONS

The present application claims priority to Korean Patent Application No. 10-2022-0105005, filed on Aug. 22, 2022, which application is hereby incorporated herein by reference.

TECHNICAL FIELD

The present invention relates to a side sill assembly for a vehicle.

BACKGROUND

Recently, new mobility visions with new concepts for implementing human-oriented dynamic future cities have been introduced to vehicle industries. One of the future mobility solutions is a purpose-built vehicle (PBV) as a purpose-based mobility vehicle.

The PBV is an environmental-friendly movement solution for providing necessary customized services to an occupant while moving to the destination on the ground. The PBV may set an optimum route for each situation and perform platooning by using electric vehicle-based, artificial intelligence.

For example, the PBV vehicle is a box-shaped design vehicle having a wide indoor space. To provide a wide indoor space, a windshield glass is provided at a foremost side of a vehicle body, an indoor entrance is provided in a lateral surface of the vehicle body, and a door is mounted in the indoor entrance to increase the size of the indoor entrance in comparison with a vehicle in the related art.

In this case, there is a need for a side sill structure that protects a lower side of the entrance of the vehicle body that is larger than that in the related art.

The foregoing explained as the background is intended merely to aid in the understanding of the background of the present invention, and is not intended to mean that the present invention falls within the purview of the related art that is already known to those skilled in the art.

SUMMARY

The present invention relates to a side sill assembly for a vehicle, and more particularly, to a technology related to a side sill assembly that has an opening portion coupled to a lateral surface of a vehicle that is larger than that in the related art.

Embodiments of the present invention is proposed to solve these problems and aims to provide a side sill assembly having two closed cross-sections coupled to a lateral portion of a floor of a vehicle.

Embodiments of the present invention provides a side sill assembly for a vehicle, the side sill assembly including: a side sill inner part coupled to a lateral portion of a floor of a vehicle and extending in a longitudinal direction of the vehicle, the side sill inner part having an accommodation space formed by recessing a partial section toward the inside of the vehicle and configured such that the link mechanism connected to a door of the vehicle is rotatably accommodated in the accommodation space; a side sill center part having a cross-section extending from the side sill inner part to the outside of the vehicle, the side sill center part extending in the longitudinal direction of the vehicle along the side sill inner part; and a side sill cover configured to define a closed cross-section by connecting the side sill center part and an upper portion of the side sill inner part in a section except for the accommodation space.

The doors of the vehicle may be configured as two opposite doors, the accommodation spaces may be provided at two opposite ends of the side sill inner part, and the side sill cover may be disposed between the accommodation spaces at the two opposite sides and couple the side sill inner part and the side sill center part.

The side sill cover may include a pair of cover portions formed by recessing two opposite ends of the side sill cover toward the side sill inner part, and the pair of cover portions may cover a closed cross-section defined by the side sill center part, the side sill inner part, and the side sill cover.

The cover portions may be coupled to an inner end of the vehicle together with the side sill inner part and the side sill center part.

The upper portion of the side sill inner part may include an upper flange extending upward and coupled to the lateral portion of the floor of the vehicle.

An upper portion of the side sill cover may be coupled to the lateral portion of the floor of the vehicle together with the upper flange of the side sill inner part.

A lower portion of the side sill cover may be coupled to an upper surface of the side sill center part, and an upper portion of the side sill cover may be coupled to the upper portion of the side sill inner part to define an inclined surface.

The side sill assembly may further include a side sill outer part extending in the longitudinal direction of the vehicle along the side sill inner part and configured to connect a lower portion of the side sill inner part and the side sill center part to define a closed cross-section.

The side sill inner part may have a recessed portion recessed toward the inside of the vehicle, the side sill center part may extend outward from the recessed portion, an upper side of the recessed portion may define a closed cross-section together with the side sill cover, and a lower side of the recessed portion may define a closed cross-section together with the side sill outer part.

The side sill outer part may protrude to the outside of the vehicle and then extend upward, and the side sill outer part may be connected to an outer portion of the side sill center part.

The side sill center part may extend to a lower side of the accommodation space and cover the lower side of the accommodation space.

According to the side sill assembly for a vehicle according to embodiments of the present invention, because the two-member shape defined by the side sill center part, the side sill inner part, the side sill cover, and the side sill outer part is positioned on the lateral portion of the floor of the vehicle, a section modulus implemented by the side sill assembly is increased in comparison with the side sill assembly in the related art. Therefore, bending rigidity and torsional rigidity may be improved in the event of a collision of the side sill assembly, which makes it possible to protect the lateral sides of the vehicle interior and the high-voltage battery positioned at the lower side of the floor.

In addition, the side sill cover may have a gradient so as to serve as a foothold when the passenger gets in or out of the vehicle, and the garnish related to the brand of the vehicle may be attached to the side sill cover, thereby improving marketability of the vehicle.

DETAILED DESCRIPTION OF ILLUSTRATIVE EMBODIMENTS

Figure 1:
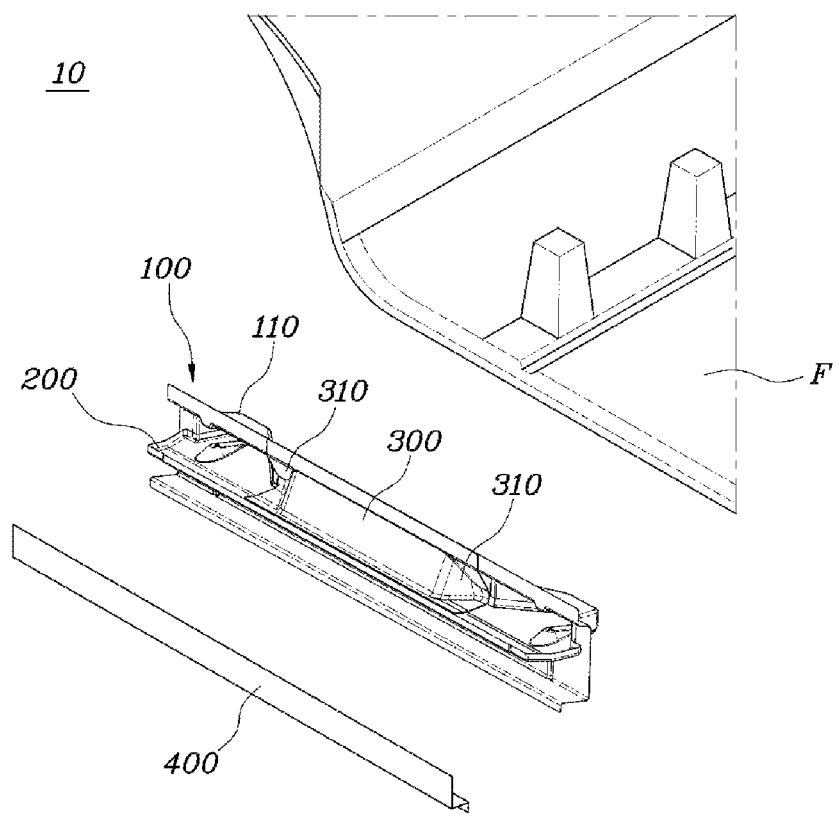
FIG. 1 is an exploded perspective view of a side sill assembly for a vehicle according to an embodiment of the present invention.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but the suffixes themselves do not have distinguishable meanings or functions.

In the description of the exemplary embodiments disclosed in the present specification, the specific descriptions of publicly known related technologies will be omitted when it is determined that the specific descriptions may obscure the subject matter of the exemplary embodiments disclosed in the present specification. In addition, it should be understood that the accompanying drawings are provided only to allow those skilled in the art to easily understand the exemplary embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Figure 2:
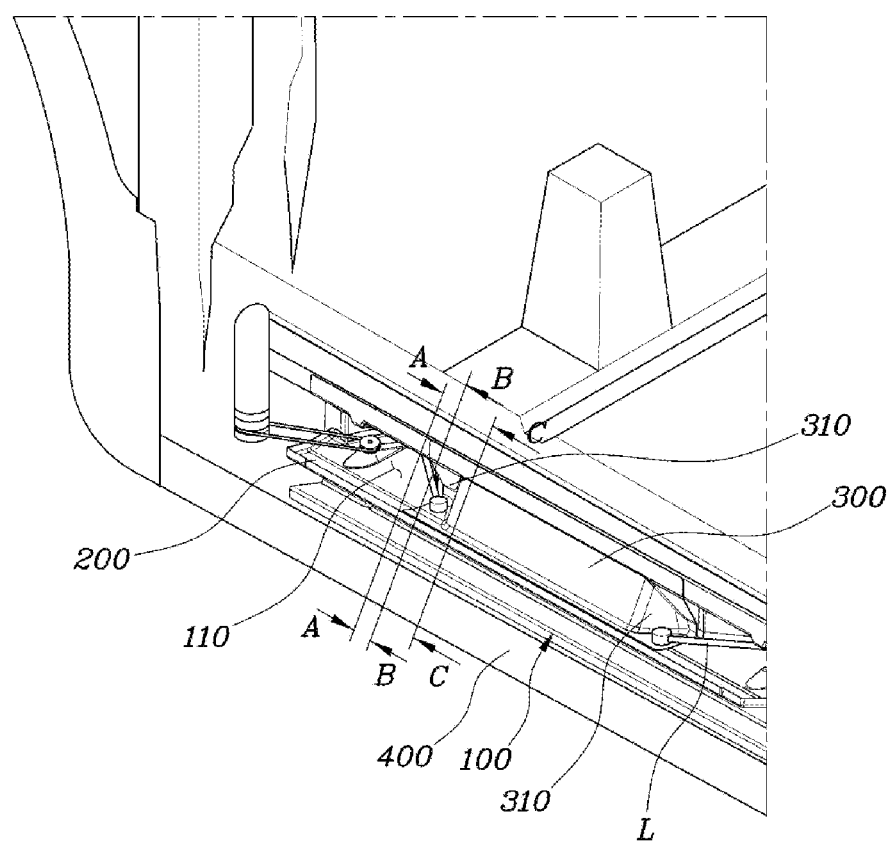
FIG. 2 is a perspective view illustrating a state in which the side sill assembly for a vehicle according to the embodiment of the present invention is assembled.
Figure 3:
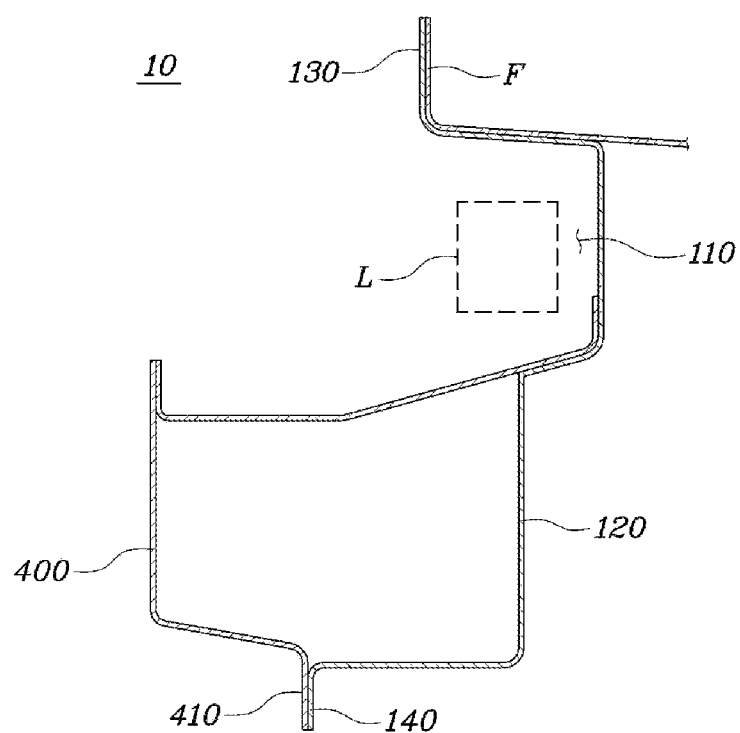
FIG. 3 is a cross-sectional view taken along line A-A in FIG. 2.
Figure 4:
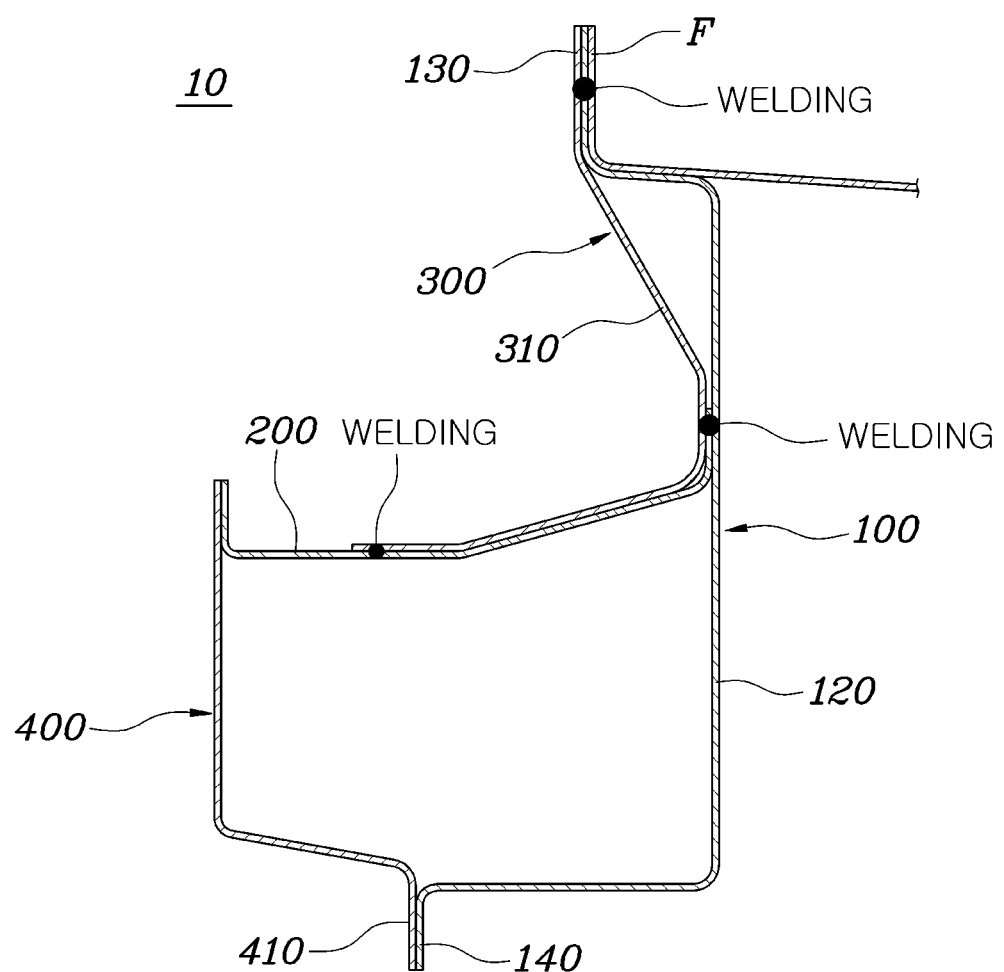
FIG. 4 is a cross-sectional view taken along line B-B in FIG. 2.
Figure 5:
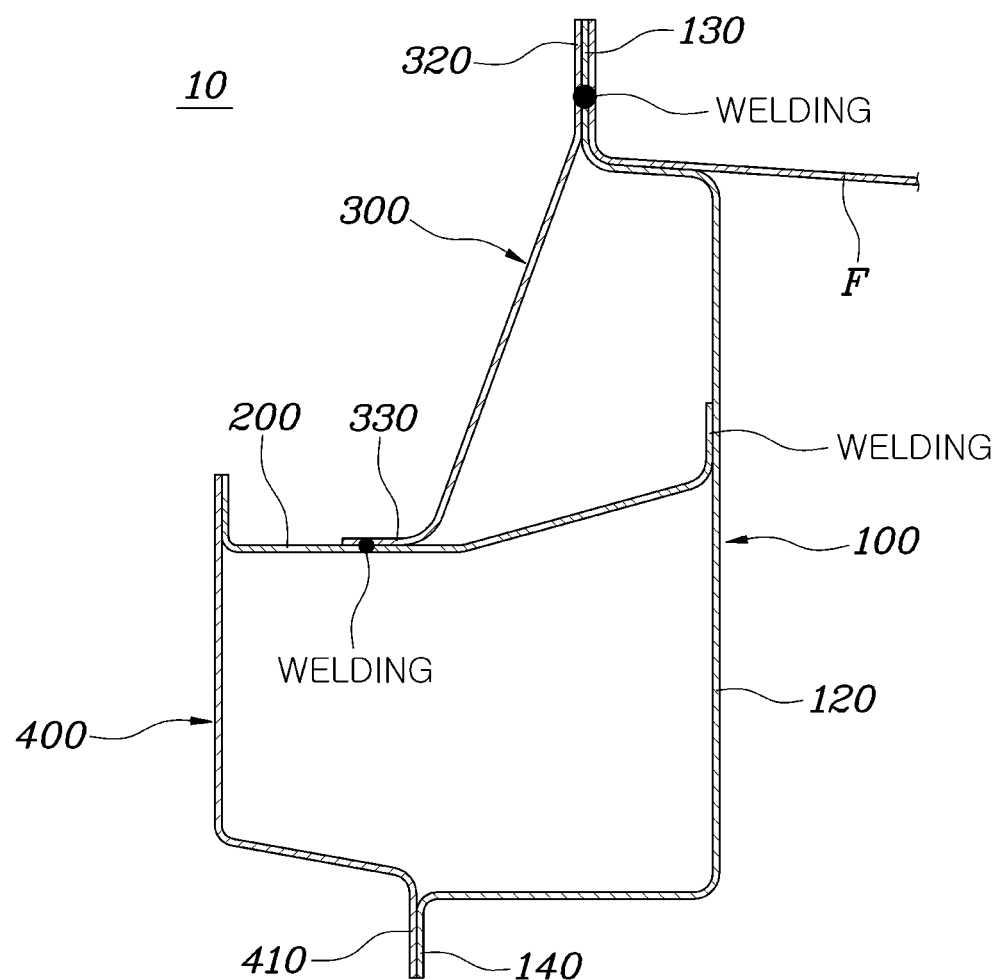
FIG. 5 is a cross-sectional view taken along line C-C in FIG. 2.

FIG. 1 is an exploded perspective view of a side sill assembly for a vehicle according to an embodiment of the present invention, FIG. 2 is a perspective view illustrating a state in which the side sill assembly for a vehicle according to the embodiment of the present invention is assembled, FIG. 3 is a cross-sectional view taken along line A-A in FIG. 2, FIG. 4 is a cross-sectional view taken along line B-B in FIG. 2, and FIG. 5 is a cross-sectional view taken along line C-C in FIG. 2.

An exemplary embodiment of a side sill assembly 10 for a vehicle according to the present invention will be described with reference to FIGS. 1 to 5.

A purpose-built vehicle (PBV), which has been developed recently, may have a large opening portion of a door, and the door configured to cover the opening portion may be connected to a vehicle body by means of a link structure.

In this case, a link mechanism L configured to connect the door and the vehicle body may be provided to connect an upper portion of the door and an upper portion of the vehicle body and connect a lower portion of the door and a lower portion of the vehicle body. The upper and lower portions of the vehicle body may have spaces that accommodate the link mechanism L when the door is closed.

The side sill assembly 10 for a vehicle according to embodiments of the present invention is provided in a lateral portion of a floor F and configured to protect a lower lateral side of the vehicle body of the vehicle having the large opening portion and accommodate the link mechanism L connected to the door and a lower side of the vehicle body.

Specifically, the side sill assembly 10 for a vehicle according to embodiments of the present invention includes: a side sill inner part 100 coupled to the lateral portion of the floor F of the vehicle and extending in a longitudinal direction of the vehicle, the side sill inner part 100 having an accommodation space 110 formed by recessing a partial section toward the inside of the vehicle and configured such that the link mechanism L connected to the door of the vehicle is rotatably accommodated in the accommodation space 110; a side sill center part 200 having a cross-section extending from the side sill inner part 100 to the outside of the vehicle, the side sill center part 200 extending in the longitudinal direction of the vehicle along the side sill inner part 100; and a side sill cover 300 configured to define a closed cross-section by connecting the side sill center part 200 and an upper portion of the side sill inner part 100 in a section except for the accommodation space 110.

As illustrated in FIGS. 1 to 2, the side sill inner part 100, the side sill center part 200, and the side sill cover 300 may extend in the longitudinal direction of the vehicle. The side sill inner part 100, the side sill center part 200, and the side sill cover 300 may each be provided in the form of a panel and coupled to one another, thereby constituting the side sill assembly 10 for a vehicle.

The upper portion of the side sill inner part 100 may be coupled to the lateral portion of the floor F of the vehicle. The accommodation space 110 is recessed toward the inside of the vehicle, such that the link mechanism L connected to the floor F of the vehicle may be rotated inward and accommodated in the accommodation space 110 at the time of closing the door.

The side sill center part 200 extends from the side sill inner part 100 to the outside of the vehicle. The side sill cover 300 may define the closed cross-section by connecting the side sill center part 200 and the upper portion of the side sill inner part 100.

Therefore, because the rigidity of the lateral side of the floor F of the vehicle is increased, it is possible to protect a passenger in the vehicle and protect a high-voltage battery disposed at a lower side of the floor F of the vehicle in the case of an electric vehicle in the event of a broadside collision of the vehicle.

In addition, the side sill cover 300 may extend in the longitudinal direction of the vehicle in a section except for the section in which the accommodation space 110 is formed.

When the door of the vehicle is opened or closed, the link mechanism L accommodated in the accommodation space 110 may be rotated and accommodated in the accommodation space 110 or moved to the outside from the accommodation space 110. In this case, the side sill cover 300 may define a member shape without interfering with the rotation of the link mechanism L.

In case that the doors of the vehicle are configured as two opposite doors, the accommodation spaces 110 may be provided at two opposite ends of the side sill inner part 100, and the side sill cover 300 may be disposed between the accommodation spaces 110 at the two opposite sides and couple the side sill inner part 100 and the side sill center part 200.

As illustrated in FIGS. 1 to 2, in case that the doors of the vehicle are configured as two opposite doors, a pair of link mechanisms L may be disposed at the lower sides of the doors of the vehicle and spaced apart from each other. The accommodation spaces 110 for accommodating the link mechanisms L may be provided at the two opposite ends of the side sill inner part 100. The side sill cover 300 may extend in the longitudinal direction of the vehicle between the accommodation spaces 110 at the two opposite sides and couple the side sill inner part 100 and the side sill center part 200.

Therefore, the side sill assembly 10 for a vehicle may be coupled to a lower side of the opening portion to which the door of the vehicle is coupled, and the side sill inner part 100 and the side sill center part 200 extend along a length of the opening portion. The accommodation spaces 110 are formed at the two opposite ends of the side sill inner part 100, and the side sill cover 300 extends between the accommodation spaces 110 in the longitudinal direction of the vehicle and is coupled. Therefore, the side sill assembly 10 may be applied to various types of vehicles having different lengths or wheelbases, such that the versatility is improved.

The side sill cover 300 may include a pair of cover portions 310 formed by recessing the two opposite ends of the side sill cover 300 toward the side sill inner part 100. The pair of cover portions 310 may cover a closed cross-section defined by the side sill center part 200, the side sill inner part 100, and the side sill cover 300.

As illustrated in FIGS. 1 to 2, the cover portions 310 are provided at the two opposite ends of the side sill cover 300 and recessed toward the side sill inner part 100 to cover the two opposite ends of a member defined as the side sill cover 300 connects the side sill inner part 100 and the side sill center part 200. Therefore, it is possible to prevent foreign substances from penetrating into the member defined by the side sill center part 200, the side sill inner part 100, and the side sill cover 300.

In addition, the cover portions 310 are formed by recessing the two opposite ends of the side sill cover 300 toward the side sill inner part 100. Therefore, as illustrated in FIGS. 2 and 4, the cover portions 310 may be formed to deviate from the rotation radii of the link mechanisms L accommodated in the accommodation spaces 110 at the two opposite sides of the side sill cover 300, thereby preventing interference with the link mechanisms L.

The cover portions 310 may be coupled to an inner end of the vehicle together with the side sill inner part 100 and the side sill center part 200.

As illustrated in FIG. 4, an inner end of the cover portion 310 may extend toward the side sill inner part 100 and be coupled to the side sill inner part 100 and an inner portion of the side sill center part 200. In this case, the side sill inner part 100, the side sill center part 200, and the side sill cover 300 may each be provided in the form of a panel and welded.

Therefore, welding portions where the side sill inner part 100, the side sill center part 200, and the side sill cover 300 may be coupled at once during a coupled process are defined. Therefore, it is possible to increase a coupling force between the side sill inner part 100, the side sill center part 200, and the side sill cover 300.

FIG. 3 is a cross-sectional view of a side of the accommodation space 110, FIG. 4 is a cross-sectional view of a side of the cover portion 310, and FIG. 5 is a cross-sectional view of a side of the side sill cover 300.

The upper portion of the side sill inner part 100 may include an upper flange 130 extending upward and coupled to the lateral portion of the floor F of the vehicle.

As illustrated in FIGS. 3 to 5, the upper flange 130 may extend upward from the upper side of the side sill inner part 100, and the upper flange 130 may be coupled to the lateral portion of the floor F of the vehicle.

Because the upper flange 130 is coupled to the lateral portion of the floor F, the convenience for an operator may be improved at the time of coupling the side sill inner part 100 to the lateral portion of the floor F of the vehicle, and the side sill assembly 10 may be positioned at a lower side of the lateral portion of the floor F.

Therefore, the side sill assembly 10 may protect the high-voltage battery, which is disposed at a lower side of the floor F of the vehicle, from a broadside collision.

The upper portion of the side sill cover 300 may be coupled to the lateral portion of the floor F of the vehicle together with the upper flange 130 of the side sill inner part 100.

As illustrated in FIGS. 4 to 5, the side sill cover 300 may include a second flange 330 extending upward so that the upper portion of the side sill cover 300 is coupled to and comes into surface contact with the lateral portion of the floor F of the vehicle together with the upper flange 130. The upper portion of the side sill cover 300 may be coupled to the upper flange 130 by welding in the state in which the upper portion of the side sill cover 300 is in surface contact with the upper flange 130.

Therefore, the side sill cover 300 and the side sill inner part 100 may be coupled to the vehicle body at once, thereby improving the coupling force between the vehicle body, the side sill cover 300, and the side sill inner part 100.

A lower portion of the side sill cover 300 may be coupled to an upper surface of the side sill center part 200, and the upper portion of the side sill cover 300 may be coupled to the upper portion of the side sill inner part 100, thereby defining an inclined surface.

As illustrated in FIGS. 1, 2, and 5, the side sill cover 300 may include a first flange 320 having a lower portion coupled to the upper surface of the side sill cover 300. An upper portion of the first flange 320 may be coupled to the upper portion of the side sill inner part 100 and extend in a diagonal direction, thereby connecting the side sill cover 300 and the upper portion of the side sill inner part 100.

Therefore, an additional garnish related to the brand of the vehicle may be attached to the side sill cover 300. The garnish may serve as a side sill of the vehicle and serve as a foothold when the passenger gets in or out of the vehicle. Therefore, it is possible to improve marketability of the vehicle.

The side sill assembly may further include a side sill outer part 400 extending in the longitudinal direction of the vehicle along the side sill inner part 100 and configured to connect the lower portion of the side sill inner part 100 and the side sill center part 200 to define a closed cross-section.

As illustrated in FIGS. 1 to 2, the side sill outer part 400 may extend in the longitudinal direction of the vehicle and connect the lower portion of the side sill inner part 100 and the side sill cover 300 to define the closed cross-section, thereby adding a member to a lower portion of the member defined by the side sill cover 300 connecting the side sill center part 200 and the side sill inner part 100. Therefore, a shape made by coupling two members may be implemented.

Because the two-member shape defined by the side sill center part 200, the side sill inner part 100, the side sill cover 300, and the side sill outer part 400 is positioned on the lateral portion of the floor F of the vehicle, a section modulus implemented by the side sill assembly 10 is increased in comparison with the side sill assembly 10 in the related art. Therefore, bending rigidity and torsional rigidity may be improved in the event of a collision of the side sill assembly 10, which makes it possible to protect the lateral sides of the vehicle interior and the high-voltage battery positioned at the lower side of the floor F.

In addition, the side sill inner part 100 may have a first lower flange 140 extending downward, the side sill outer part 400 may have a second lower flange 410 extending downward, and the first lower flange 140 and the second lower flange 410 may be coupled to each other.

The first lower flange 140 and the second lower flange 410 may be in surface contact with each other and coupled by welding, thereby increasing the coupling force.

The side sill inner part 100 has a recessed portion 120 recessed toward the inside of the vehicle, and the side sill center part 200 extends outward from the recessed portion 120. An upper side of the recessed portion 120 may define a closed cross-section together with the side sill cover 300, and a lower side of the recessed portion 120 may define a closed cross-section together with the side sill outer part 400.

As illustrated in FIGS. 3 to 4, the side sill inner part 100 has the recessed portion 120 recessed toward the inside of the vehicle, and the side sill center part 200 may be coupled to a center side of the recessed portion 120. The upper side of the recessed portion 120 may be formed as a part of the closed cross-section defined by the coupled side sill cover 300, and the lower side of the recessed portion 120 may be formed as a part of the closed cross-section defined by the coupled side sill outer part 400.

Therefore, the recessed portion 120 may simultaneously expand cross-sectional areas of the members defined at the upper and lower portions of the side sill center part 200. Because the cross-sectional area of the closed cross-section is expanded, it is possible to improve bending rigidity and torsional rigidity of the lateral portion of the vehicle.

The side sill outer part 400 may protrude to the outside of the vehicle and then extend upward, and the side sill outer part 400 may be connected to an outer portion of the side sill center part 200.

As illustrated in FIGS. 3 to 5, the side sill outer part 400 may protrude and extend to the outside of the vehicle from the lower portion of the side sill inner part 100, and then the side sill outer part 400 may be bent upward and extend. Further, the upper portion of the side sill outer part 400 may be coupled to the outer portion of the side sill center part 200.

In this case, the outer portion of the side sill center part 200 may be bent upward and extends, and the outer portion of the side sill center part 200 may be in surface contact with and coupled to the upper end of the side sill outer part 400 extending upward. Because the side sill center part 200 and the side sill outer part 400 are manufactured in a panel shape, welding may be applied.

Because the side sill outer part 400 extending upward is coupled to the end of the side sill center part 200, the coupling force and bending rigidity may be increased, thereby more safely protecting the vehicle body in the event of a broadside collision.

The side sill center part 200 may extend to the lower side of the accommodation space 110 and cover the lower side of the accommodation space 110.

As illustrated in FIGS. 1 to 2, the side sill center part 200, which is coupled to the side sill inner part 100 and extends outward, extends to the lower side of the accommodation space 110 and defines a lower surface of the accommodation space 110. Therefore, an axis of the link mechanism L extending in an upward/downward direction may be connected, which makes it possible to stably rotate the link mechanism L and prevent penetration of foreign substances introduced from the lower side.

While the specific embodiments of the present invention have been illustrated and described above, it will be obvious to those skilled in the art that the present invention may be variously modified and changed without departing from the technical spirit of the present invention defined in the appended claims.

What is claimed is:

1. A side sill assembly for a vehicle, the side sill assembly comprising:
    a side sill inner part coupled to a lateral portion of a floor of a vehicle and extending in a longitudinal direction of the vehicle, the side sill inner part having an accommodation space formed by recessing a partial section toward an inside of the vehicle and configured such that a link mechanism connected to a door of the vehicle is rotatably accommodated in the accommodation space;
    a side sill center part having a cross-section extending from the side sill inner part to an outside of the vehicle, the side sill center part extending in the longitudinal direction of the vehicle along the side sill inner part; and
    a side sill cover configured to define a closed cross-section by connecting the side sill center part and an upper portion of the side sill inner part in a section except for the accommodation space.

2. The side sill assembly of claim 1, wherein the door of the vehicle is one of two opposite doors of the vehicle, accommodation spaces of the doors are provided at two opposite ends of the side sill inner part, and the side sill cover is disposed between the accommodation spaces at two opposite sides and couple the side sill inner part and the side sill center part.

3. The side sill assembly of claim 2, wherein the side sill cover comprises a pair of cover portions formed by recessing two opposite ends of the side sill cover toward the side sill inner part, and the pair of cover portions covers a closed cross-section defined by the side sill center part, the side sill inner part, and the side sill cover.

4. The side sill assembly of claim 3, wherein the cover portions are coupled to an inner end of the vehicle together with the side sill inner part and the side sill center part.

5. The side sill assembly of claim 1, wherein an upper portion of the side sill inner part comprises an upper flange extending upward and coupled to the lateral portion of the floor of the vehicle.

6. The side sill assembly of claim 5, wherein an upper portion of the side sill cover is coupled to the lateral portion of the floor of the vehicle together with the upper flange of the side sill inner part.

7. The side sill assembly of claim 1, wherein a lower portion of the side sill cover is coupled to an upper surface of the side sill center part, and an upper portion of the side sill cover is coupled to the upper portion of the side sill inner part to define an inclined surface.

8. The side sill assembly of claim 1, further comprising:
a side sill outer part extending in the longitudinal direction of the vehicle along the side sill inner part and configured to connect a lower portion of the side sill inner part and the side sill center part to define a closed cross-section.

9. The side sill assembly of claim 8, wherein the side sill inner part has a recessed portion recessed toward the inside of the vehicle, the side sill center part extends outward from the recessed portion, an upper side of the recessed portion defines a closed cross-section together with the side sill cover, and a lower side of the recessed portion defines a closed cross-section together with the side sill outer part.

10. The side sill assembly of claim 8, wherein the side sill outer part protrudes to the outside of the vehicle and then extends upward, and the side sill outer part is connected to an outer portion of the side sill center part.

11. The side sill assembly of claim 1, wherein the side sill center part extends to a lower side of the accommodation space and covers the lower side of the accommodation space.

12. A side sill assembly for a vehicle, the side sill assembly comprising:
a side sill inner part coupled to a floor of a vehicle, the side sill inner part extending along a side of the floor of the vehicle, the side sill inner part having a recessed portion recessed toward an inside of the vehicle;
a side sill center part extending from the recessed portion of side sill inner part to an outside of the vehicle; and
a side sill cover configured to define a closed area between the side sill center part and an upper portion of the side sill inner part, the recessed portion being free of the side sill cover.

13. The side sill assembly of claim 12, wherein the recessed portion is configured such that a link mechanism connected to a door of the vehicle is rotatably accommodated in the recessed portion.

14. The side sill assembly of claim 12, wherein the side sill cover includes a pair of cover portions formed by recessing two ends of the side sill cover toward the side sill inner part.

15. The side sill assembly of claim 12, wherein an upper portion of the side sill inner part comprises an upper flange extending upward and coupled to the floor of the vehicle.

16. The side sill assembly of claim 15, wherein an upper portion of the side sill cover is coupled to the floor of the vehicle together with the upper flange of the side sill inner part.

17. The side sill assembly of claim 12, further comprising:
a side sill outer part extending along the side sill inner part and configured to connect a lower portion of the side sill inner part and the side sill center part to define a closed cross-section.

18. The side sill assembly of claim 17, wherein the side sill outer part protrudes to the outside of the vehicle and then extends upward, and the side sill outer part is connected to an outer portion of the side sill center part.

19. The side sill assembly of claim 12, wherein the side sill center part extends to a lower side of the recessed portion and covers the lower side of the recessed portion.

* * * * *